United States Patent
Hedrick et al.

[15] 3,662,535
[45] May 16, 1972

[54] AIRCRAFT TIME INDICATOR

[72] Inventors: Geoffrey S. Hedrick, Bedford Hills, N.Y.; Frank H. Hawkins, Bennebroek; William Van Os, Badhoevedorp, both of Netherlands

[73] Assignee: Lear Siegler, Inc., Armonk, N.Y.

[22] Filed: July 10, 1969

[21] Appl. No.: 840,729

[52] U.S. Cl.....................................58/39.5, 58/127, 58/125
[51] Int. Cl.............................................G04f 3/06
[58] Field of Search.....................58/1, 2, 3, 23, 42.5, 43–44, 58/125–127, 145–147, 152

[56] References Cited

UNITED STATES PATENTS

| 334,525 | 1/1886 | Gott | 58/125 B |
| 483,696 | 10/1892 | Reiss | 58/125 B |
| 2,533,638 | 12/1950 | Norris | 58/146 |

Primary Examiner—Richard B. Wilkinson
Assistant Examiner—Edith C. Simmons
Attorney—Wilfred O. Schmidt and Hubbell, Cohen & Stiefel

[57] ABSTRACT

A clock and two elapsed time meters are incorporated in the same instrument and driven from a common electronic time base oscillator. The time of day is indicated by a set of digital read-out drums located above the center of a circular dial, while long term cumulative elapsed time is indicated by another digital drum read-out located below the center of the dial. At the periphery of the dial is a circular scale representing short term cumulative elapsed time, which is swept by a peripheral minute indicator as well as a sweep second hand, both of which are designed not to interfere with the digital displays.

5 Claims, 4 Drawing Figures

3,662,535

INVENTORS
GEOFFREY S. HEDRICK
FRANK H. HAWKINS
WILLIAM VAN OS
ATTORNEYS.

INVENTORS
GEOFFREY S. HEDRICK
FRANK H. HAWKINS
WILLIAM VAN OS
BY
ATTORNEYS.

3,662,535

AIRCRAFT TIME INDICATOR

FIELD OF THE INVENTION

This invention relates generally to aerospace instrumentation, and particularly concerns a multifeature clock and timing device.

THE PRIOR ART

The cockpit of an aircraft, particularly a large commercial airliner, is a busy place, and the activities that go on there are of crucial importance to the lives of many people. The instrument panel of such an aircraft contains an array of many instruments which present various types of information of importance in controlling the flight of the aircraft. Conventionally, one of these instruments is a clock, since time is one of the parameters which the pilot takes into account.

Time is important to the pilot, for example, in estimating his time of arrival at a destination, as well as in helping to determine his position at any particular moment. It is also important to know how many hours of flight have been accumulated by the aircraft since the last refueling as a check on fuel consumption. Finally, air traffic control directions given to the pilot may be couched in terms of flight at a certain altitude and compass heading for a stated period of time, usually measured in minutes and seconds.

As a result, there is a need for a reliable instrument which tells the time of day, which measures elapsed time over many hours of flight, and which also has a separate indication of elapsed time of the order of minutes or seconds spent flying at a particular altitude or heading. To accomplish these functions by means of three different instruments would contribute to the already impressive clutter of the instrument panel, would detract from overall readability, and possibly confuse the flight crew, something which should be avoided at all costs. In addition, it is uneconomical to employ three different instruments when several timing functions can be combined in a single device and driven by a common time base.

THE INVENTION

For these reasons, the present invention provides a single aircraft timing instrument having three separate displays: time of day, long term elapsed time, and short elapsed time; all of which are driven be a single high accuracy time base oscillator of the type which is suitable for operation from power supplies commonly available on aircraft. In addition, the timing instrument of this invention is designed so that the compacting of three separate time read-outs into a single instrument face is done without allowing them to interfere with each other.

An instrument according to the invention includes at least one motor, means for driving the motor at a substantially constant rate, and read-out means driven by the motor which comprise one display giving a running indication of the time of day and two additional displays giving running indications of long and short term elapsed time periods respectively. As pointed out more specifically below, both digital and dial type read-out techniques are employed to convey a maximum amount of information in the small display area allotted to a single timing instrument on an aircraft instrument panel.

BRIEF DESCRIPTION OF THE DRAWINGS

The same reference numerals refer to the same elements throughout the several views of the drawing.

DETAILED DESCRIPTION OF THE PREFERRED EMBODIMENT

Figure 1:
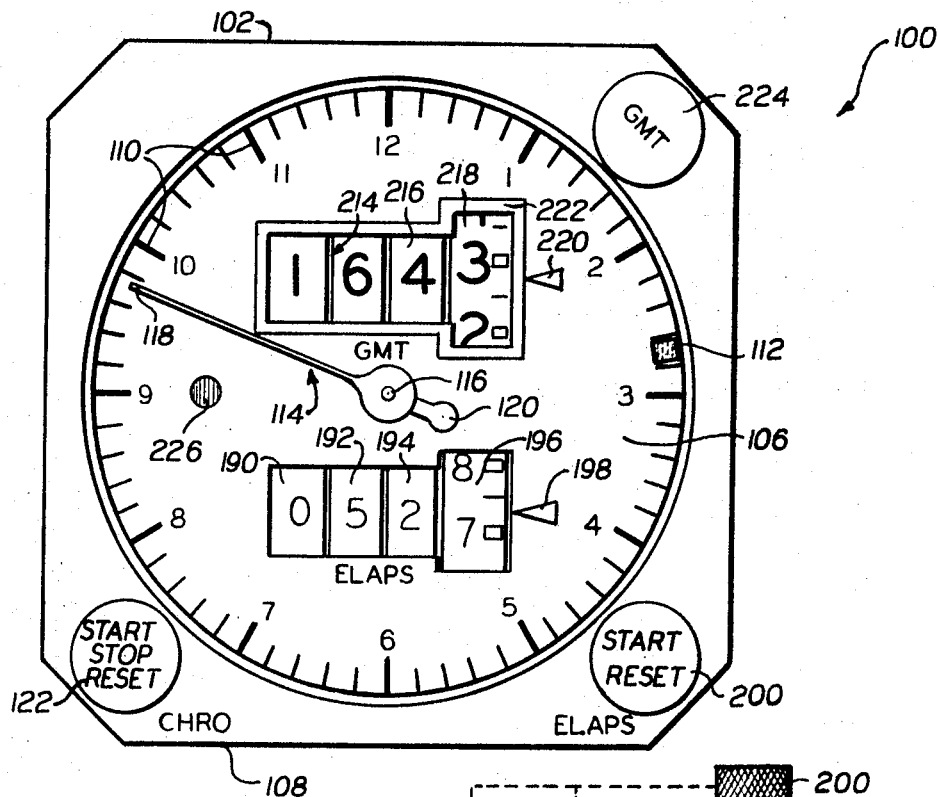
FIG. 1 is a front elevational view of an aircraft timing instrument in accordance with this invention, showing the display face and panel controls thereof.

The aircraft timing instrument 100 of this invention is enclosed within a casing which includes a front panel flange 102 surrounding a transparent display window behind which is a circular dial face 106. Within the display window are three separate read-outs, each indicating a different one of three time-related quantities.

One of these is a short term elapsed time read-out which is useful when a pilot has to follow air traffic control instructions based upon the length of time during which an airplane is to be flown at a particular altitude and/or compass heading. This read-out comprises a circular scale 110 marked off around the periphery of the dial face 106 and reading up to a maximum of 12 minutes. A minute indicator or bug 112 extends radially inward a short distance from the periphery of the dial 106, and is driven along the peripheral edge by the timed drive of the instrument when the short term elapsed time chronometer is running. The indicator 112 is driven at a speed such that it performs one full revolution about the circular dial 106 in 12 minutes.

Also included in the short term elapse time read-out is a sweep second hand 114 which is driven by a centrally located shaft 116, and comprises a long, narrow, needle-like pointer 118 for read-out purposes. The sweep second hand 114 is geared to the peripheral minute indicator 112 at a ratio such that the second hand performs one complete revolution about the circular dial face 106 in 60 seconds.

The short term elapsed time chronometer is manually controlled by a button 122 mounted on the front panel flange 102. This button can be used to start the short term chronometer, to interrupt it any number of times without resetting it to zero so that isolated time periods can be accumulated, and also to reset it to zero when a measurement is completed. Naturally, the functions of button 122 could be performed by a switch at a remote location connected by electrical means.

Figure 2:
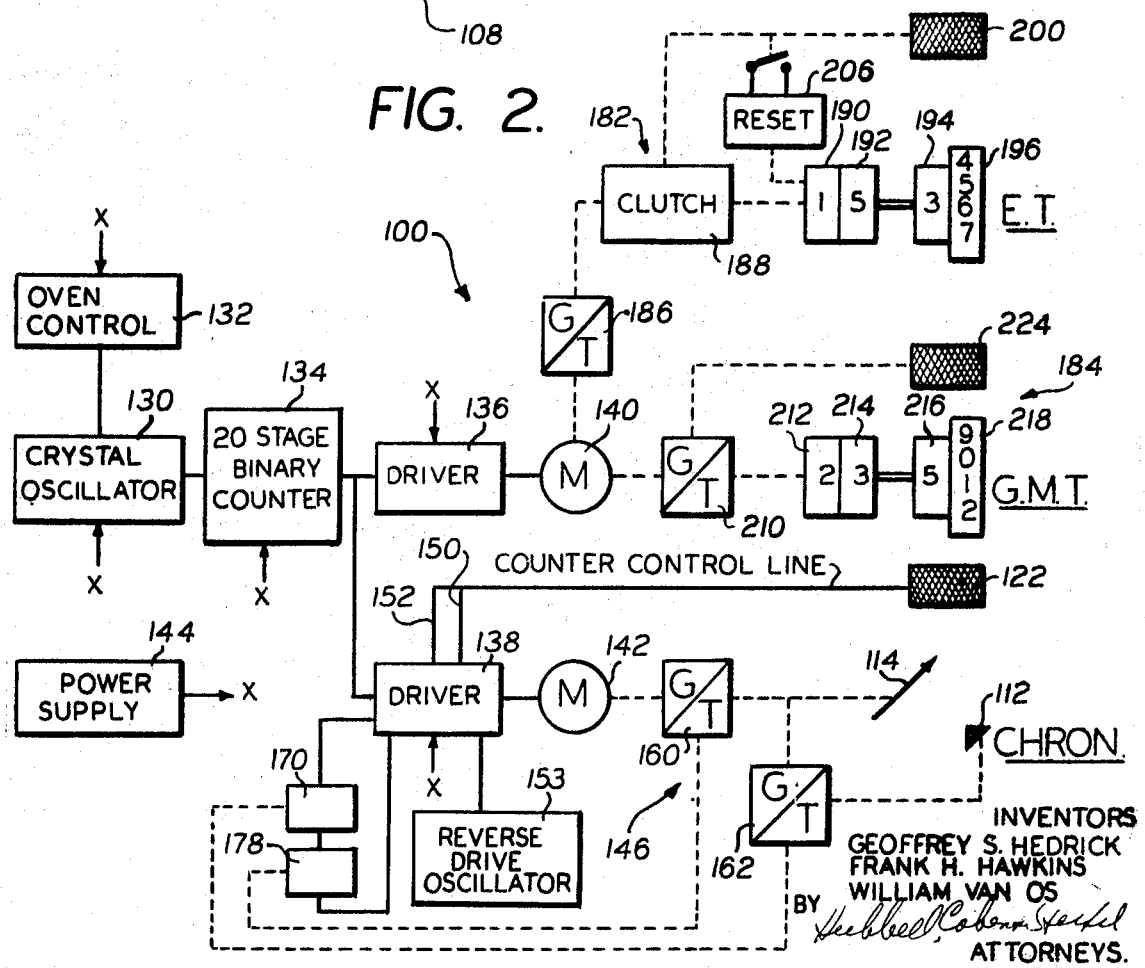
FIG. 2 is a schematic diagram showing the overall organization of the instrument.

As seen in FIG. 2, the time base for the entire instrument 100 is provided by an oscillator 130 governed by a conventional constant temperature crystal frequency standard. As shown, temperature constancy is assured by the usual oven enclosure controlled by a thermostatic circuit 132, although other means of achieving frequency stability may be employed. The high frequency output of the crystal oscillator 130 is divided down by a multistage binary counter, here shown as 20-stage binary counter 134, to divide the pulse repetition frequency down to levels usable in a mechanical read-out. The output of the counter circuit 134 pulses a pair of circuits, such as driver circuits 136 and 138 which provide output power levels and waveforms suitable for driving synchronous timing motors 140 and 142 respectively. A D.C. power supply 144 is connected as shown by the "x's" to the circuits 130 through 138.

Figure 4:
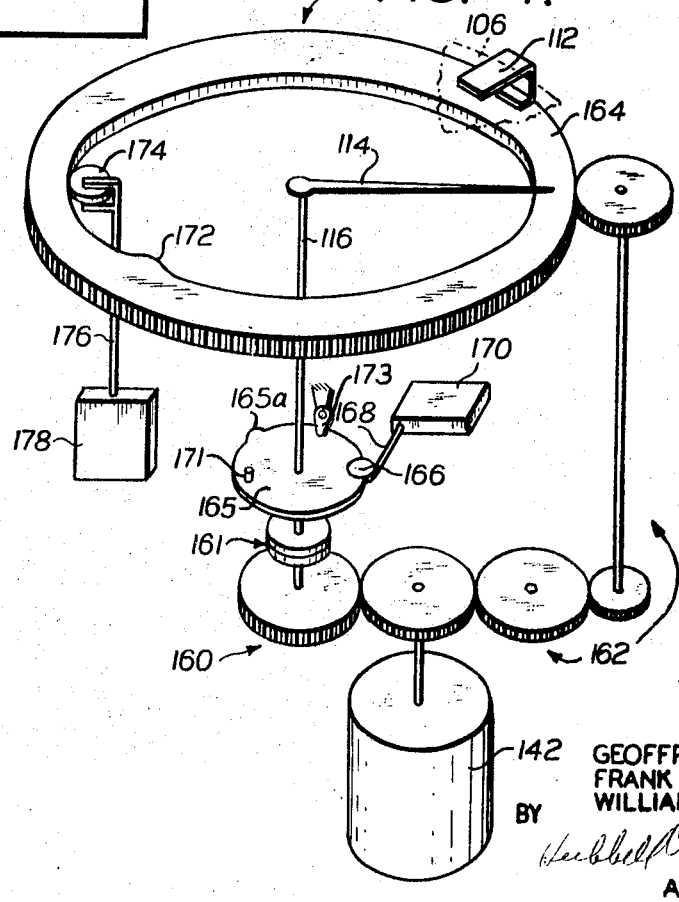
FIG. 4 is a schematic representation of the drive train from the other timing motor of the instrument to the read-out of the short term elapsed time chronometer.

The timing motor 142 drives the short term elapsed time chronometer, generally designated 146 in FIGS. 2 and 4. There it is seen that the manual control knob 122 for the chronometer 146 performs two schematically represented control functions relative to the driver circuit 138. Reference numeral 150 represents a functional connection means between the manual control knob circuit interrupting means such as a switch for electrically disconnecting timing motor 142 from its driver circuit 138 to thereby interrupt the drive to the chronometer mechanism. Note that this does not reset the second hand 114 and minute indicator 112 to zero, but rather leaves them both at their locations at the time of interruption from which they can resume their timed advance if the aircraft crew manually operates the control knob 122 to reconnect driver circuit 138 to the motor 142 to thus accumulate an additional increment of elapsed time.

Reference numeral 152 represents a functional connection means between knob 122 and driver circuit 138 for switching driver circuit 138 from the output stage of binary counter 134 to an earlier stage thereof to result in a lower effective frequency division ratio so as to overdrive the motor 142 at an abnormally high speed for the purpose of rapidly resetting the short term chronometer 146 to zero. Additionally, connection means 152, when operated, reverses the direction of driver circuit 138 whereby to operate motor 142 in a reverse direction, and through internal gating controlled by an internal single pole double throw switch, closes the gate for the time base oscillator 130 and opens the gate for the reverse drive oscillator 153. However, the time base oscillator could be employed during reset, if desired.

As seen in FIG. 4, the timing motor 142 drives the sweep second hand 114 through a gear train 160 and a slip clutch 161, and the peripheral minute indicator 112 through another gear train 162 culminating in a ring gear 164 upon which the peripheral minute indicator or bug 112 is directly mounted. In the physical layout of the timing instrument 100 as shown, the ring gear 164 is located behind the circular dial face 106, and the peripheral minute indicator 112 extends forwardly over the edge of the dial 106 and then curls over the front surface thereof so as to be visible through the transparent front window of the instrument. Other arrangements may be employed.

During the zero-setting operation, the switch closure represented by connection 152 of FIG. 2 is a momentary operation which latches driver circuit 138 in the overdriving mode. An abnormally high timing motor speed then continues until both the second hand 114 and minute indicator 112 have reached their zero positions. In order to detect when zeroing of both indicators 112 and 114 has occurred, the sweep second hand shaft 116 has a cam 165 mounted thereon with a cam rise 165a which is tracked by a cam follower 166 mounted on the actuating arm 168 of a microswitch 170. When the sweep second hand 114 reaches its zero position, stop 171 on gear 164 strikes pawl 173 which stops gear 164 and hand 114 in the zero position, and cam 164 moves the follower 166 and arm 168 to close the microswitch 170. Motor 142 continues operating to drive bug 112 to its zero position, this having no effect on hand 114 due to the inclusion of slip clutch 161. To detect zero position of bug 112, there is a cam rise 172 on the internal circular periphery of the ring gear 164 which acts against a cam follower roller 174 mounted on an actuating arm 176 for closure of a second microswitch 178 whenever the peripheral indicator 112 reaches zero. Closure of both microswitches 170 and 178, indicating that second hand 114 and minute indicator 112 are both zeroed, activates a coincidence detector incorporated in the driver circuit 138 and switches off the circuit 138 so that it is no longer driven by the counter 134. At that point, the short term elapsed time chronometer 146 turns off, leaving both its read-out indicators 112 and 114 in their respective zero positions. When the chronometer 146 is turned on again by use of the manual knob 122 for the next measurement, it will again be driven at normal speed, and both read-out indicators 112 and 114 will start from their respective zero positions.

The other timing motor 140 drives a second elapsed time indicator 182, this one designed to measure long intervals of up to 100 hours for the purpose of logging flight time of the aircraft. Motor 140 also drives a conventional clock 184 which can be set to read out Greenwich Mean Time or time of day relative to any other earth meridian.

The long term elapsed time indicator 182 takes its drive from the time motor 140 through a gear train 186 and clutch 188, and indicates elapsed time through a set of revolving drums 190 through 196 which are inscribed with numerals to present a digital read-out. Drum 190 indicates tens of hours, drum 192 units of hours, drum 194 tens of minutes, and drum 196 units of minutes. Physically, drums 190, 192 and 196 are situated in the central region of the circular dial 106 below the sweep second hand shaft 116, where they do not interfere with readability of the circular short term elapsed time dial 110 and the seconds and minutes indicators 114 and 112 thereof. A pointer 198 inscribed on the dial 106 adjacent the continuously turning drum 196 aids in determining the exact digit to be read on the latter drum. The drum 196 transmits motion to drums 194, 192 and 190 in turn through conventional Geneva-type intermittent movements.

A manual control knob 200 on the front panel flange 102 of the instrument is used to interrupt and restart the long term elapsed time indicator 182 without resetting it, so that isolated time intervals can be accumulated. For example, the elapsed time indicator 182 can be restarted when the pilot turns on his engines in preparation of aircraft taking off, turned off when the engines are shut down after landing, and turned back on again when the engines are again turned on for the next leg of a flight, to thus indicate the duration of engine operation and give an indication of the fuel consumption. In addition, the manual control knob 200 has the capability of resetting the long term elapsed time indicator 182 to zero when the end of the long term time measurement is reached.

Figure 3:
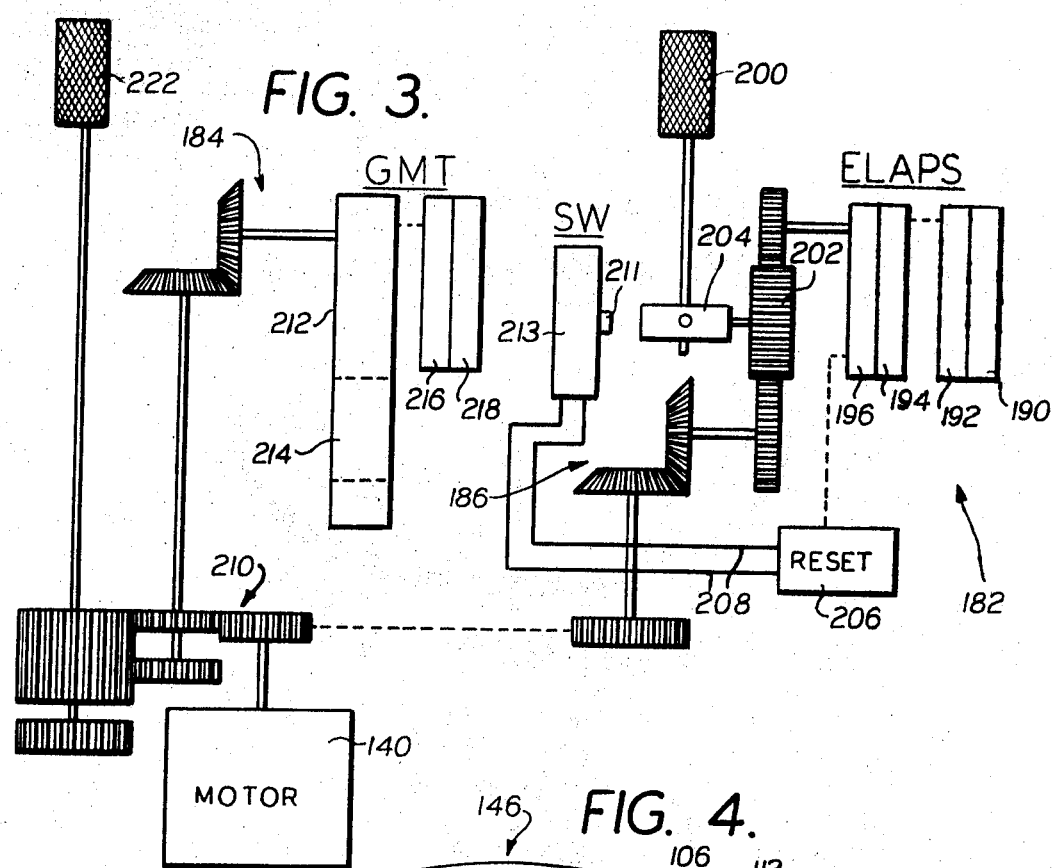
FIG. 3 is a schematic representation of the mechanical drive train from one of the timing motors of the instrument to the clock and long term elapsed time read-outs thereof.

The operation of the interruption and zero reset features on the long term elapsed time indicator is best appreciated from FIG. 3. There it is seen that the timing motor 140 drives the digital drums 190 through 196 through a gear train 186. This includes a gear 202 which responds to a conventional mechanism 204 controlled by the manual knob 200 to disconnect the gear train 186 when it is desired to interrupt the elapsed time indicator 182. When this is done, the drums 190 through 196 remain in their current position, from which they again advance when the manual control knob 200 and mechanism 204 are used to re-engage the gear 202.

When it is desired to reset the long term elapsed time indicator 182 to zero, the device makes use of an electromechanical resetting mechanism 206 which may be conventional and which can be electrically triggered by an impulse arriving over a pair of wires 208.

The other digital read-out 184 is driven by the same timing motor 140 through a gear train 210, and reads out the time of day through a set of digital drums 212, 216 and 218 which are geneva-driven in the same manner as the drums 190 through 196. Drum 212 drives a 24 position hours belt 214, drum 216 reads in tens of minutes and drum 218 in units of minutes. Naturally other GMT display mechanisms may be employed. The time of day is given on a 24 hour basis, although it can also be designed to read conventional 12 hour time, if desired.

The read-out drums 212, 216 and 218 are physically located in the center of the circular dial 106 above the sweep second hand shaft 116, again so as not to interfere with the scale 110 or with the indicators 112 and 114. A marker 220 is inscribed on the dial to aid in reading the continuously moving units of minutes drum 218, and in addition, there is a light-colored border 222 on the circular dial 106 in the region immediately surrounding the digital read-out drums 212, 216 and 218, which serves to distinguish GMT from the other digital read-outs.

The time of day read-out 184 has a manual control knob 224 which is physically located on the front panel flange 102, and functions to manually reset the time indicated by the drums 212 through 218 if for any reason the mechanism 184 does not indicate the proper time. A conventional power failure indicator 226 is also provided and is located in an appropriate window formed near the center of the dial 106. Indicator 226 will, upon any power interruption occurring, give a visual indication of such, and will continue to give the indication, even after power has been restored, until reset knob 224 is operated.

It is of particular importance to note that the narrow needle-like pointer 118 has approximately the same breadth as the space between the adjacent center drums 214 and 216 of the uppermost digital time read-out, and that this space between the drums 214 and 216 falls on an imaginary radial line drawn from the center of dial 106 to the "12" indicator of scale 110, which represents the zero position of pointer 118. As a result, when the short term elapsed time chronometer is at rest, the pointer 118 is stowed precisely between the drums 214 and 216. This, coupled with the fact that the numerals inscribed on the drums 214 and 216 are spaced apart somewhat more widely than are the margins of the drums themselves, allows the pointer 118 to reset within the center space of the time of day digital read-out without interfering with the readability of the latter.

On the other hand, when the short term elapsed time chronometer is operative and the sweep second hand thereof is moving, the narrow needle-like pointer 118 moves at second hand speeds so rapidly across the digital drums 190 through 196 and 212 through 218 that it does not stay in one place long enough to obscure either of these digital read-outs. Tail portion 120 of the sweep second hand has a very short radial length, and therefore does not interfere at all with either of the digital drum read-outs.

Note also that the minutes indicator 112 is located at the periphery of the circular dial 106 and extends only a very short distance radially inward therefrom. Accordingly, it does not reach far enough into the central region of the circular dial 106 to interfere at all with the reading of the two digital drum read-outs 192 through 196 and 212 through 218.

As a result, neither the second hand 114 nor the minutes indicator 112 of the short term elapsed time chronometer detracts substantially from the readability of the other two displays. This is of key importance in the design of an instrument which displays three different time-related quantities within the confined space of a single display dial.

It will now be appreciated that this invention enables the three types of time read-outs described to be incorporated physically within a single instrument and driven by a single electronic time base, yet it displays all three time-related quantities within a single instrument dial without any interfering with each other. In addition, the long and short term elapsed time indicators of the instrument can be interrupted and restarted without resetting to zero, or if desired, can be readily reset to zero, all by means of their own separate manual control for each time-related quantity.

The invention claimed is:

1. A chronometric instrument for installation in an aircraft and the like, said instrument including a multidrum counter for digitally displaying time; and a dial type display means comprising a dial face having in the vicinity of the periphery thereof time scale indicia thereon, a sweep second hand in front of said dial face mounted for rotary movement relative to said time scale indicia, a minute pointer disposed in front of said dial face only adjacent the periphery thereof, means for drivingly supporting said minute pointer disposed away from the front of said dial face, motor means for driving said display means at a substantially constant rate, means for resetting said dial type display means to zero position, said dial having a cut-out in register with said multidrum counter, said multidrum counter being so positioned relative to said second hand that when said second hand is in said zero position, it lies between adjacent drums in said counter, whereby to minimize interference therewith.

2. The instrument of claim 1, further comprising a second multidrum counter in register with a second cut-out in said dial face, means for operating one of said multidrum counters in accordance with time of day, and means for operating the other of said multidrum counters in accordance with elapsed time from a predetermined datum.

3. The instrument of claim 2, said two multidrum counters being disposed above and below, respectively, the axis of rotation of said sweep second hand and said minute pointer and inwardly of the path of movement of said minute pointer.

4. The instrument of claim 3, further comprising means for resetting to zero said elapsed time multidrum counter.

5. The instrument of claim 4, wherein said motor means comprises a first motor for driving said multidrum counters, and a second motor for driving said dial type display means, and means for connecting and disconnecting said elapsed time multidrum counter from and to said first motor means without resetting said elapsed time multidrum counter to zero comprising:

manual control means having first and second positions; and
a drive train for said elapsed time multidrum counter including an element for closing and opening said drive train in response to said manual control being moved into and out of said first position for continuing and discontinuing the drive to said elapsed time multidrum counter;
said reset means for said elapsed time multidrum counter including electrically actuated means for returning said elapsed time multidrum counter to zero, and a switch controlling said electrical means to initiate said return to zero;
said switch including an actuator responsive to said second position of said manual control means to initiate said return to zero.

* * * * *